United States Patent [19]

Imataki et al.

[11] Patent Number: 4,965,153
[45] Date of Patent: Oct. 23, 1990

[54] OPTICAL RECORDING MEDIUM

[75] Inventors: Hiroyuki Imataki, Kawasaki; Mizuho Hiraoka, Isehara; Sachiko Ichikawa, Sagamihara; Hitoshi Yoshino, Atsugi; Yoshihiro Ogawa, Sagamihara, all of Japan

[73] Assignee: Canon Kabushiki Kaisha, Tokyo, Japan

[21] Appl. No.: 39,022

[22] Filed: Apr. 16, 1987

[30] Foreign Application Priority Data

Apr. 21, 1986 [JP] Japan ................................ 61-89953

[51] Int. Cl.$^5$ ......................... G03C 1/72; B41M 5/24; G11B 7/24
[52] U.S. Cl. ..................................... 430/11; 430/14; 430/273; 430/275; 430/276; 430/945; 346/135.1; 369/277; 369/284
[58] Field of Search ............... 430/945, 495, 273, 275, 430/276, 346, 270, 964, 9, 11, 14; 346/135.1, 137; 369/273, 275, 283, 284, 277

[56] References Cited

U.S. PATENT DOCUMENTS

| 4,318,112 | 3/1982 | Kivits | 430/964 |
| 4,363,844 | 12/1982 | Lewis et al. | 428/65 |
| 4,519,065 | 5/1985 | Lewis et al. | 428/65 |
| 4,547,876 | 10/1985 | Ettenberg | 369/275 |
| 4,616,237 | 10/1986 | Pettigrew et al. | 430/945 |
| 4,651,172 | 3/1987 | Watanabe et al. | 430/945 |
| 4,729,938 | 3/1988 | Tajima et al. | 430/272 |
| 4,818,666 | 4/1989 | Gravesteijn et al. | 430/495 |

FOREIGN PATENT DOCUMENTS

| 74834 | 5/1982 | Japan | 369/275 |
| 38945 | 3/1984 | Japan | 369/275 |
| 171046 | 9/1984 | Japan | 369/284 |

Primary Examiner—Paul R. Michl
Assistant Examiner—Lee C. Wright
Attorney, Agent, or Firm—Fitzpatrick, Cella, Harper & Scinto

[57] ABSTRACT

An optical recording medium for writing and reading information by use of a beam of light comprises an optical recording layer comprising a light-reflective layer and a light-absorptive layer having been preformatted in the form of grooves.

11 Claims, 1 Drawing Sheet

OPTICAL RECORDING MEDIUM

BACKGROUND OF THE INVENTION

1. Field of the Invention

The present invention relates to an optical recording medium which can optically write and read information.

2. Related Background Art

Optical recording media conventionally demanded are those wherein a change of shape, change of structure or change of a constant of a physical property, is caused in a medium to thereby write and read information.

Known products that can satisfy such a demand may include, for example, those wherein pits are made in a recording layer with use of a dye or pigment as disclosed in Japanese Patent Laid-Open No. 82645/1984; those wherein pits are made in a metallic film as disclosed in Japanese Patent Laid-Open No. 96716/1974; those wherein a metallic film is transformed as disclosed in Japanese Patent Laid-Open No. 171689/1984; those wherein a change of an optical constant due to a change from the crystal phase to the amorphous phase is utilized as disclosed in Japanese Patent Laid-Open No. 46317/1975; etc.

On the other hand, there is known an optical recording medium of the type wherein the change of shape is caused in a recording layer.

As materials that can cause such a change of shape in a recording layer, low melting metals such as Te, Bi, Sn, Sb and In, or dyes or pigments (organic colorants) of cyanine type, squarium type, phthalocyanine type or methine type are known to have been used in some examples. However, in the case of the metals, containing less absorptive components, a high power is required for the "writing", and, in the case of the organic colorants, the reflectance thereof is so low that the S/N ratio can not be higher, obtaining no satisfactory results in either of the cases.

For this reason, an optical recording medium comprising a recording layer formed by laminating a reflective layer formed by the metals and an absorptive layer formed by the organic colorants has been proposed in Japanese Patent Laid-Open No. 45642/1984, etc.

On the other hand, in the above optical recording medium, it is required to previously provide pre-grooves (or guide grooves) for assisting a tracking servo, or address data for controlling the recording of data, in order to increase the capacity and enhance the reliability in writing and reading information.

For this purpose, as usually called "pre-formatting" and generally used in an optical disc or the like, a substrate 1 is grooved with a given style as shown in FIG. 3 and an optical recording layer 2 formed by laminating a light-absorptive layer 3 and a light-reflective layer 4 is provided on the substrate, thus performing the pre-formatting.

As a method therefor, there is the so-called 2P method in which an ultraviolet-curable type resin is applied on a substrate and the information having been pre-formatted is transferred to its surface by means of a stamper, or a method in which the transfer is carried out by forming a stamper in a mold at the time of the injection molding of a substrate.

However, when the optical recording portion is comprised of a light-reflective layer and a light-absorptive layer as shown in FIG. 3, there is a problem that the pre-format formed on the substrate can not be reproduced with good precision.

In other words, the tracking can be achieved only with difficulty at the time of the writing and reading, and also performance errors may be increased. As a result, the reliability on the information to be written and read may be lowered.

SUMMARY OF THE INVENTION

An object of the present invention is to provide an optical recording medium having a high reliability of information.

Another object of the present invention is to provide an optical recording medium that can achieve a good yield and low cost in the production thereof.

According to an aspect of the present invention, there is provided an optical recording medium for writing and reading information by use of a beam of light, which comprises an optical recording layer comprising a light-reflective layer and a light-absorptive layer having been pre-formatted in the form of grooves.

More specifically, the optical recording medium of the present invention comprises an optical recording layer having a light-absorptive layer having been pre-formatted in the form of grooves, thereby bringing about great advantages that the reliability in writing and reading information can be increased and the medium can be produced with ease to provide it inexpensively.

According to another aspect of the present invention, there is provided a process for optical recording, which comprises irradiating a laser beam on an optical recording medium having an optical recording layer comprising a light-reflective layer and a light-absorptive layer having been pre-formatted in the form of grooves, and forming pits on the crest and/or the grooves, to effect the recording.

DETAILED DESCRIPTION OF THE PREFERRED EMBODIMENTS

Figure 1:
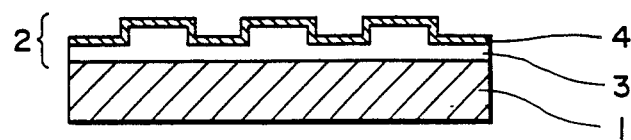
FIG. 1 is a cross-section showing a typical example for the constitution of the optical recording medium of the present invention.

The present invention will be described below in detail with reference to the accompanying drawings. FIG. 1 is a cross-section showing a typical example for the constitution of the present invention. In FIG. 1, the optical recording medium of the present invention comprises an optical recording layer 2 formed by laminating a light-reflective layer 4 on a light-absorptive layer 3 having been pre-formatted in the form of grooves, and this optical recording layer 2 is provided on a substrate 1 in the manner that the light-absorptive layer 3 side is downward positioned.

The pre-formatting constituted like this can bring about the information that may cause less performance errors and have a high reliability.

Figure 2:
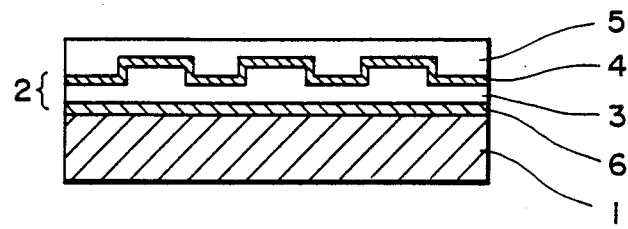
FIG. 2 is a cross-section showing another example for the constitution.
Figure 3:
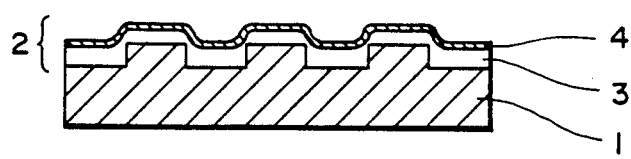
FIG. 3 is a cross-section showing a conventional optical recording medium in which a substrate has been preformatted.

FIG. 2 is a cross-section showing another example for the constitution of the present invention, wherein the light-reflective layer 4 laminated on the light-absorptive layer having been pre-formatted in the form of grooves is covered with a protective layer 5, and the light-absorptive layer 3 is provided on the substrate 1 through the interposition of an adhesive layer 6. The adhesive layer may be omitted if unnecessary.

In the present invention, the substrate 1 that can be used may include glass plates, ceramics plates, metallic plates or sheets made of aluminum, stainless steel, etc, and plastic plates made of polycarbonate, polyvinyl chloride, polymethyl methacrylate (PMMA), etc. The substrate may be either transparent or opaque, and may have any size without any particular limitation so far as the function as a support of an optical recording medium can be satisfied. Also, the substrate can be omitted when the light-absorptive layer is sufficiently thick.

In the present invention, a characteristic feature of the invention is that the optical recording layer 2 comprises the light-reflective layer 4 and the light-absorptive layer 3 having been pre-formatted in the form of grooves.

The optical recording layer comprises the so-called heat mode recording material that can absorb light when irradiated with a beam of light, and can convert the absorbed light to heat to form recording pits by the heat. Further, it is required to have reflection characteristics to read the signal.

Taking account of this point, the present invention has a feature that the light-reflective layer 4 and the light-absorptive layer 3 are laminated to each other to make the optical recording layer.

In the present invention, the light-reflective layer constitutes an important factor for defining the S/N ratio of the recorded information, and is required to have a large ratio of the reflection intensity before recording to the reflection intensity after recording. In addition, the signal reflected from this light-reflective layer serves as the signal for performing AT (auto-tracking) and AF (auto-focusing) which are important for the writing and reading in an optical recording medium.

When considering these points, the reflectance of the light-reflective layer is more preferable as it is higher, but, considering the recording in the medium, an appropriate transmittance is also required, and thus a reasonable balance is required between the both.

The reflectance of the light-reflective layer may be 10 to 85%, preferably 15 to 60%, in respect of the wavelength of the writing and reading light, in particular, the reading light. Here, the reflectance is defined as a ratio of incident light $I_O$ to reflected light I, namely, $I/I_O$. Also, in this case, the reflectance refers to the value obtained through the protective layer of the recording medium.

As the reflective layer, preferred are metallic layers formed by vapor deposition, and electroless plating such as chemical plating and physical development, using metals such as gold, silver, copper, tin, aluminum, nickel and chromium; or metallic particle-dispersed layers comprised of a coating formed by dispersing particles of these metals in a vehicle.

As the material for constituting the light-reflective layer, it may include organic, reflective materials, for example dyes such as anthraquinone derivatives, particularly those having indanthrene structure, dioxazine compounds and derivatives thereof, triphenodithiazine compounds, phenanthrene derivatives, cyanine compounds, merocyanine compounds, pyrylium compounds, xanthene compounds, triphenylmethane compounds, croconium dyes, croconic dyes and polymethine dyes, which can be used depending on the relation to the wavelength of the beam of light.

The film thickness of the light-reflective layer is determined depending on the reflectance determined in relation to the light-absorptive layer constituting the optical recording layer, and on the processing method therefor, namely, on what is selected from the vapor deposition, the electroless plating and the coating of a dispersion medium, and it may range between several Å and several mm, preferably 20 Å and 1.0 mm.

In the present invention, the light-absorptive layer has both the function to absorb energy of the light irradiated for the recording and covert it to heat energy, and the function to transform itself by the heat to form a recording portion with the laminated reflective layer.

The light-absorptive layer is comprised of light-absorptive materials such as organic coloring materials having absorption characteristics at a wavelength of a recording beam at the time of optical recording, or by dispersing these light-absorptive materials in a binder.

The light-absorptive materials that can be preferably used may include;

(1) low melting metals such as Te, Bi, Sn, Sb and In, and particles of metals such as Au, Ag and Cu;

(2) organic coloring materials of cyanine type, squarium type, phthalocyanine type, tetradehydrocholine type, methine type, naphthoquinone type, polymethine type, etc.;

(3) organic metal complexes such as a benzene dithiol nickel complex;

(4) black dyes or pigments such as Nigrosine and carbon black; and (5) black toners used in copying machines, and inorganic compounds such as magnetite (FeO).

The vehicle or binder for dissolving or dispersing these light-absorptive materials may include organic high molecular substances comprising vinyl type resins such as polyvinyl chloride, polyvinyl alcohol and polyvinyl acetate, olefine type resins such as polyethylene and polypropylene, acrylic resins such as polymethyl methacrylate and polymethyl acrylate, resins of polyester type, polyamide type, polystyrene type, cellulose type, polycarbonate type, ionomer type, etc., and copolymers or mixtures of these resins; organic carboxylic acids such as stearic acid, palmitic acid, phthalic acid and succinic acid; solid paraffin; etc.

As these materials, preferably usable are those which can cause melting or heat-softening at a lower temperature of not more than 400° C., preferably at a lower temperature of not more than 200° C.

The light-absorptive layer thus constituted may desirably have a film thickness of several Å to several mm, preferably 700 Å to 1.8 mm.

According to the present invention, the characteristic feature is that the light-absorptive layer has been pre-formatted.

Method for the pre-formatting may include;

(1) a method in which the light-absorptive layer is stamped by means of a stamper prepared in conformity with a beforehand given pattern while optionally applying heat;

(2) a method in which the light-absorptive layer is formed from a photo-curable resin in the same manner as in the 2P method used for optical discs; and (3) a method in which a stamper is used as a mold in producing the light-absorptive layer by thermoforming.

In the present invention, the optical recording layer is provided on the substrate 1. Here, the light-absorptive layer 3 and the light-reflective layer 4 may be applied in sequence on the substrate 1 to set the optical recording layer, or the optical recording layer may be provided on the substrate by interposing an adhesive layer comprising a dry laminating agent or the like.

In the case where the optical recording layer is applied beforehand on a thin film such as in, for example, a silver salt emulsion material, the optical recording layer can be set on the substrate together with the film by interposing the adhesive agent.

In the present invention, the protective layer 5, which imparts resistance to mechanical, chemical and physical environment of the optical recording layer, covers the optical recording layer 2 with a material transparent to the writing and reading light.

For example, a glass plate, a ceramic plate, a plastic plate made of polymethyl methacrylate, polycarbonate, polyvinyl chloride, polyethylene terephthalate, polystyrene, CR-39, polymethylpentene, etc. may be provided on the optical recording layer by optionally interposing an adhesive layer.

For another example, a plastic material as mentioned above may be applied directly on the optical recording layer, and may be allowed to cure to make the protective layer. In this instance, a radiation-curable resin may be used as a measure therefor.

The protective layer is provided on the optical recording layer, but may not necessarily be in close contact therewith, and may be provided by interposing a spacer, and interposing air or inert gas.

On the outside surface of the protective layer, there may be optionally applied abrasion resistance treatment, hardening treatment, stain- and contamination-proof treatment and antistatic treatment for the purpose of preventing scratches or attachment of dusts during being handled; or moisture-proof treatment, ultraviolet-proof treatment and oxygen permeation-proof treatment ($O_2$ gas barrier treatment) aiming at the improvement in durability.

Irradiating a laser beam on the optical recording medium of the present invention from the optical recording layer side to carry out the writing of information, recording pits are formed on the light-irradiated portion of the optical recording layer provided with a pre-format. At the time the writing of information is carried out by this laser irradiation, the writing of information can be performed precisely as the pre-format has been clearly formed in order, and, along with the softening and melting of the light-absorptive layer, the shape of the recording pits is corrected to make pits being free from any rims and having uniform size, thereby giving excellent reading signals.

The present invention will be described below more specifically by showing Examples.

Example 1

As an optical recording medium, a polyethylene terephthalate substrate (Lumirror T, trademark; available from Toray K.K.) of 10 cm long, 10 cm broad and 250 $\mu$m thick was coated with a cyclohexane solution containing 3% of Nigrosine according to bar coating to form a film of 2 $\mu$m as a light-absorptive layer. This light-absorptive layer was beforehand pre-formatted on its surface by hot press stamping with use of a stamper provided with a format of width 5 $\mu$m, length 80 mm and depth 0.5 $\mu$m, having a repetitive pitch of 10 $\mu$m.

Subsequently, as a light-reflective layer, copper was vacuum-deposited on the grooved surface of this light-absorptive layer to have a film thickness of 50 Å, thus forming an optical recording layer.

On the resulting optical recording layer, writing was performed by use of a semiconductor laser (830 nm) of beam diameter of 3 $\mu$m and with an output of 3 mW.

Reading was performed with beam diameter of 3 $\mu$m and an output of 0.1 mW. As a result, a good contrast of 0.5 or more was obtained.

Example 2

A substrate of the type same as in Example 1 was coated with carbon black (available from Columbia Carbon Co.; RAVEN 1255, trademark) mixed with polyvinyl butyral as a binder (mixing ratio of 1:1) to form a film of 3 $\mu$m thick.

Subsequently, pre-formatting was carried out in the same procedures as in Example 1, and, on the pre-formatted light-absorptive layer, aluminum was vapor-deposited with a thickness of 50 as a light-reflective layer, thus forming an optical recording layer.

On this recording layer, an acrylic plate of 0.4 mm thick was adhered as a protective layer to construct an optical recording medium, and recording performance thereof was studied.

Under the same conditions as in Example 1 for the writing and reading, the good reading contrast of 0.7 was obtained.

Example 3

Pre-formatting was carried out in the same manner as in Example 1 on a card-like black acrylic plate (available from Nitto Jushi Kogyo K.K.; CLAREX ®-S, trademark) of 55 mm long, 85 mm broad and 0.5 mm thick, and, on the resulting layer, gold was vapor-deposited with a thickness of 50 Å. On the layer, a transparent acrylic plate (available from Nitto Jushi Kogyo K.K.; CLAREX ®-S, trademark) of 0.2 mm thick was further adhered as a protective layer to form an optical recording medium.

Under the same conditions as in Example 1 for the writing and reading, the good reading contrast of 0.75 was obtained.

Examining AT signals by use of an oscillograph, the signals according to the present invention were observed to be sharp with a pattern uniform and identical at every portion. However, in comparative examples, the pattern was out of shape, and irregular and non-uniform at some portions.

Comparative Evaluations

It is possible according to the present invention to obtain excellent pre-formatted signals by directly applying the pre-formatting on the light-absorptive layer. In particular, good AT signals are most important for optical recording.

In the following, the number of times of AT errors in the writing and reading on 2,560 tracks is shown.

|  | Present invention | Comparative example |
| --- | --- | --- |
| Example 1 | 5 times | 78 times |
| Example 2 | 3 times | 86 times |
| Example 3 | 2 times | — |

Here, the comparative examples show the data obtained when an optical recording layer was provided on a substrate on which the pre-formatting was applied.

(Other conditions were the same as those in the corresponding Examples.)

What we claim is:

1. A method of preparing an optically recorded member comprising a recording layer comprising a light reflective layer and a light absorptive layer, for writing and reading information using a light beam, said method comprising the steps of:

forming the light absorptive layer on a non-pre-formatted substrate, the light absorptive layer having a first side and a second side, the first side being on the non-pre-formatted substrate;

thereafter forming a pre-format of guide grooves using a stamper or a mold on the second side of the light absorptive layer;

forming a light reflective layer on the second side of the light absorptive layer; and irradiating a laser beam on the thus created optical recording medium to form pits on the crest and/or the groove to effect recording.

2. The method of preparing an optically recorded member as recited by claim 1, wherein said recording layer consists of the light reflective layer and the light absorptive layer.

3. A method of preparing an optical recording medium comprising a recording layer comprising a light reflective layer and a light absorptive layer having a first side and a second side, for writing and reading information using a light beam, comprising the steps of:

forming the light absorptive layer on a non-pre-formatted substrate, the light absorptive layer having on the first side the non-preformatted substrate;

thereafter forming a pre-format of guide grooves using a stamper or a mold on the second side; and forming a light reflective layer on the second side of the light absorptive layer.

4. The method of preparing an optical recording medium as recited in claim 3, wherein said recording layer consists of the light reflective layer and the light absorptive layer.

5. The method of preparing an optical recording medium according to claim 3, including providing a protective layer on the optical recording layer.

6. The method of preparing an optical recording medium according to claim 3, wherein the light-reflective layer has a reflectance of 15 to 60%.

7. The method of preparing an optical recording medium according to claim 3, wherein the light-reflective layer comprises a metallic or metallic particle-dispersed layer.

8. The method of preparing an optical recording medium according to claim 3, wherein the light-reflective layer has a thickness of from 20 Å to 1 mm.

9. The method of preparing an optical recording medium according to claim 3, wherein the light-absorptive layer comprises a light-absorptive material or light-absorptive material-dispersed layer.

10. The method of preparing an optical recording medium according to claim 6, wherein the light-absorptive material is a dye or pigment.

11. The method of preparing an optical recording medium according to claim 3, wherein the light-absorptive layer has a thickness of from 700 Å to 1.8 mm.

* * * * *

UNITED STATES PATENT AND TRADEMARK OFFICE
CERTIFICATE OF CORRECTION

PATENT NO. : 4,965,153
DATED : October 23, 1990
INVENTOR(S) : HIROYUKI IMATAKI ET AL.

It is certified that error appears in the above-identified patent and that said Letters Patent is hereby corrected as shown below:

COLUMN 4

Line 22, "include;" should read --include:--.
Line 57, "Method" should read --Methods-- and "include;" should read --include:--.

COLUMN 5

Line 35, "dusts" should read --dust--.

COLUMN 6

Line 19, "50" should read --50Å--.

COLUMN 8

Line 27, "claim 6," should read --claim 9,--.

Signed and Sealed this

Thirteenth Day of October, 1992

Attest:

DOUGLAS B. COMER

*Attesting Officer*     *Acting Commissioner of Patents and Trademarks*